(12) United States Patent
Mathew et al.

(10) Patent No.: US 8,014,099 B2
(45) Date of Patent: Sep. 6, 2011

(54) SYSTEMS AND METHODS FOR USING AN ON-THE-FLY CBD ESTIMATE TO ADJUST FLY-HEIGHT

(75) Inventors: George Mathew, San Jose, CA (US); Yuan Xing Lee, San Jose, CA (US); Hongwei Song, Longmont, CO (US); Jefferson E. Singleton, Westminster, CO (US)

(73) Assignee: LSI Corporation, Milpitas, CA (US)

( * ) Notice: Subject to any disclaimer, the term of this patent is extended or adjusted under 35 U.S.C. 154(b) by 297 days.

(21) Appl. No.: 12/254,737

(22) Filed: Oct. 20, 2008

(65) Prior Publication Data
US 2009/0154003 A1    Jun. 18, 2009

Related U.S. Application Data

(60) Provisional application No. 61/013,657, filed on Dec. 14, 2007.

(51) Int. Cl.
*G11B 5/60* (2006.01)

(52) U.S. Cl. .......................................................... 360/75

(58) Field of Classification Search ........................ None
See application file for complete search history.

(56) References Cited

U.S. PATENT DOCUMENTS

| | | |
|---|---|---|
| 3,973,182 A | 8/1976 | Kataoka |
| 3,973,183 A | 8/1976 | Kataoka |
| 4,024,571 A | 5/1977 | Dischert et al. |
| 4,777,544 A | 10/1988 | Brown et al. |
| 5,130,866 A | 7/1992 | Klaassen et al. |
| 5,237,325 A | 8/1993 | Klein et al. |
| 5,278,703 A | 1/1994 | Rub et al. |
| 5,309,357 A | 5/1994 | Stark et al. |
| 5,341,249 A | 8/1994 | Abbott et al. |
| 5,377,058 A | 12/1994 | Good et al. |
| 5,521,948 A | 5/1996 | Takeuchi |
| 5,523,902 A | 6/1996 | Pederson |
| 5,668,679 A | 9/1997 | Swearingen et al. |
| 5,696,639 A | 12/1997 | Spurbeck et al. |
| 5,781,129 A | 7/1998 | Schwartz et al. |

(Continued)

OTHER PUBLICATIONS

Annampedu, V. and Aziz, P.M., "Adaptive Algorithms for Asynchronous Detection of Coded Servo Signals Based on Interpolation", IEEE Trans. on Mag., vol. 41, No. 10, Oct. 2005.

(Continued)

*Primary Examiner* — Hoa T Nguyen
*Assistant Examiner* — James L Habermehl
(74) *Attorney, Agent, or Firm* — Hamilton DeSanctis & Cha

(57) ABSTRACT

Various embodiments of the present invention provide systems and methods for using channel bit density estimates to adjust fly-height. For example, various embodiments of the present invention provide methods for adaptively adjusting fly-height. Such methods include providing a storage medium that includes information corresponding to a process data set, and a read/write head assembly that is disposed a variable distance from the storage medium. The process data set is accessed from the storage medium. A first channel bit density estimate is adaptively calculated based at least in part on the process data set and a second channel bit density estimate that was previously calculated. The variable distance is modified based at least in part on the first channel bit density estimate. A third channel bit density is adaptively calculated based at least in part on the process data set and a fourth channel bit density estimate that was previously calculated. The variable distance is modified based at least in part on the third channel bit density estimate.

22 Claims, 7 Drawing Sheets

U.S. PATENT DOCUMENTS

| | | | |
|---|---|---|---|
| 5,798,885 | A | 8/1998 | Saiki et al. |
| 5,835,295 | A | 11/1998 | Behrens |
| 5,844,920 | A | 12/1998 | Zook et al. |
| 5,852,524 | A | 12/1998 | Glover et al. |
| 5,986,830 | A | 11/1999 | Hein |
| 5,987,562 | A | 11/1999 | Glover |
| 6,009,549 | A | 12/1999 | Bliss et al. |
| 6,023,383 | A | 2/2000 | Glover et al. |
| 6,069,583 | A | 5/2000 | Silvestrin et al. |
| 6,081,397 | A | 6/2000 | Belser |
| 6,111,712 | A | 8/2000 | Vishakhadatta et al. |
| 6,208,478 | B1 | 3/2001 | Chiu et al. |
| 6,278,591 | B1 | 8/2001 | Chang |
| 6,400,518 | B1 | 6/2002 | Bhaumik et al. |
| 6,404,829 | B1 | 6/2002 | Sonu |
| 6,441,661 | B1 | 8/2002 | Aoki et al. |
| 6,490,110 | B2 | 12/2002 | Reed et al. |
| 6,493,162 | B1 | 12/2002 | Fredrickson |
| 6,519,102 | B1 | 2/2003 | Smith |
| 6,530,060 | B1 | 3/2003 | Vis et al. |
| 6,603,622 | B1 | 8/2003 | Christiansen et al. |
| 6,606,048 | B1 | 8/2003 | Sutardja |
| 6,611,390 | B1 * | 8/2003 | Egan ............... 360/31 |
| 6,633,447 | B2 | 10/2003 | Franck et al. |
| 6,646,822 | B1 | 11/2003 | Tuttle et al. |
| 6,657,802 | B1 | 12/2003 | Ashley et al. |
| 6,775,529 | B1 | 8/2004 | Roo |
| 6,788,484 | B2 | 9/2004 | Honma |
| 6,813,108 | B2 | 11/2004 | Annampedu et al. |
| 6,816,328 | B2 | 11/2004 | Rae |
| 6,839,014 | B2 | 1/2005 | Uda |
| 6,856,183 | B2 | 2/2005 | Annampedu |
| 6,876,511 | B2 | 4/2005 | Koyanagi |
| 6,912,099 | B2 | 6/2005 | Annampedu et al. |
| 6,963,521 | B2 | 11/2005 | Hayashi |
| 6,999,257 | B2 | 2/2006 | Takeo |
| 6,999,264 | B2 | 2/2006 | Ehrlich |
| 7,002,767 | B2 | 2/2006 | Annampedu et al. |
| 7,038,875 | B2 | 5/2006 | Lou et al. |
| 7,072,137 | B2 | 7/2006 | Chiba |
| 7,082,005 | B2 | 7/2006 | Annampedu et al. |
| 7,092,462 | B2 | 8/2006 | Annampedu et al. |
| 7,116,504 | B1 | 10/2006 | Oberg |
| 7,126,776 | B1 | 10/2006 | Warren, Jr. et al. |
| 7,136,250 | B1 | 11/2006 | Wu et al. ............... 360/75 |
| 7,154,689 | B1 | 12/2006 | Shepherd et al. |
| 7,167,328 | B2 | 1/2007 | Annampedu et al. |
| 7,180,693 | B2 | 2/2007 | Annampedu et al. |
| 7,187,739 | B2 | 3/2007 | Ma |
| 7,191,382 | B2 | 3/2007 | James et al. |
| 7,193,544 | B1 | 3/2007 | Fitelson et al. |
| 7,193,798 | B2 | 3/2007 | Byrd et al. |
| 7,199,961 | B1 | 4/2007 | Wu et al. ............... 360/75 |
| 7,203,013 | B1 | 4/2007 | Han et al. |
| 7,206,146 | B2 | 4/2007 | Flynn et al. |
| 7,230,789 | B1 | 6/2007 | Brunnett et al. |
| 7,253,984 | B1 | 8/2007 | Patapoutian et al. |
| 7,301,717 | B1 | 11/2007 | Lee et al. |
| 7,308,057 | B1 | 12/2007 | Patapoutian |
| 7,359,139 | B1 * | 4/2008 | Wu et al. ............... 360/75 |
| 7,362,536 | B1 | 4/2008 | Liu et al. |
| 7,375,918 | B1 | 5/2008 | Shepherd et al. |
| 7,411,531 | B2 | 8/2008 | Aziz et al. |
| 7,420,498 | B2 | 9/2008 | Barrenscheen |
| 7,423,827 | B2 | 9/2008 | Neville et al. |
| 7,446,690 | B2 | 11/2008 | Kao |
| 7,499,238 | B2 | 3/2009 | Annampedu |
| 7,508,616 | B2 * | 3/2009 | Fitzpatrick et al. ............... 360/75 |
| 7,518,820 | B1 * | 4/2009 | Wu et al. ............... 360/75 |
| 7,620,101 | B1 | 11/2009 | Jenkins |
| 2002/0001151 | A1 | 1/2002 | Lake |
| 2002/0150179 | A1 | 10/2002 | Leis et al. |
| 2002/0176185 | A1 | 11/2002 | Fayeulle et al. |
| 2002/0181377 | A1 | 12/2002 | Nagata et al. |
| 2003/0095350 | A1 | 5/2003 | Annampedu et al. |
| 2005/0046982 | A1 | 3/2005 | Liu et al. |
| 2005/0157415 | A1 | 7/2005 | Chiang |
| 2005/0243455 | A1 | 11/2005 | Annampedu |
| 2007/0071152 | A1 | 3/2007 | Chen et al. |
| 2007/0104300 | A1 | 5/2007 | Esumi et al. |
| 2007/0183073 | A1 | 8/2007 | Sutardja et al. |
| 2007/0230015 | A1 | 10/2007 | Yamashita et al. |
| 2007/0263311 | A1 | 11/2007 | Smith |
| 2008/0080082 | A1 | 4/2008 | Erden et al. |
| 2008/0212715 | A1 | 9/2008 | Chang |
| 2008/0266693 | A1 | 10/2008 | Bliss et al. |
| 2009/0002862 | A1 | 1/2009 | Park |
| 2009/0142620 | A1 | 6/2009 | Yamamoto et al. |

OTHER PUBLICATIONS

.Aziz and Annampedu, "Asynchronous Maximum Likelihood (ML) Detection of Servo repeatable Run Out (RRO) Data".

Aziz & Annampedu, "Interpolation Based Maximum-Likelihood(ML) Detection of Asynchronous Servo Repeatable Run Out (RRO) Data", IEEE Int. Mag. Con., vol. 42, No. 10, Oct. 2006.

* cited by examiner

SYSTEMS AND METHODS FOR USING AN ON-THE-FLY CBD ESTIMATE TO ADJUST FLY-HEIGHT

CROSS REFERENCE TO RELATED APPLICATIONS

The present application claims priority to (is a non-provisional of) U.S. Pat. App. No. 61/013,657 entitled "Adaptive CBD Estimation for Closed-Loop Fly Height Control", and filed Dec. 14, 2007 by Mathew et al. The entirety of the aforementioned application is incorporated herein by reference for all purposes.

BACKGROUND OF THE INVENTION

The present inventions are related to systems and methods for accessing a storage medium, and more particularly to systems and methods for determining the location of a read/write head assembly in relation to a storage medium.

Writing information to a magnetic storage medium includes generating a magnetic field in close proximity to the storage medium to be written. This may be done using a read/write head assembly as are commonly known in the art, and is highly dependent on properly positioning the read/write head assembly in relation to a magnetic storage medium. In particular, the distance between the read/write head assembly and the storage medium is commonly referred to as fly-height. Proper control of the fly-height helps to assure that the read back signal exhibits the best possible signal-to-noise ratio, and thereby improves performance. In a typical implementation, fly-height is determined based on harmonic measurements during a non-operational period. Such an approach uses a vacant or dedicated area on the magnetic storage medium to write a periodic pattern from which the harmonics may be measured. While the approach provides a reasonable static estimate of fly-height, it does not provide an indication of any change in fly-height occurring during standard operational periods. As such, the approaches do not provide an ability to adjust for changes occurring during the operation of the disk. Other approaches use CBD estimation to determine fly-height. This approach relies on estimating the CBD from various ADC samples by means of a de-convolution approach. This is based on truncating the correlation-length of the channel impulse response, and approximating the channel impulse response by the dipulse (bit) response. The de-convolution requires matrix inversion, and it becomes very difficult to implement the matrix inversion as the matrix size increases, which it does as the truncation length of the channel correlation is relaxed. It is also difficult to use this approach to obtain the CBD variation in continuous fashion, as it works on a block by block basis. Yet other approaches use an available AGC signal for inferring the fly-height. Such an approach is able to continuously monitor fly-height during normal operational periods, however, the accuracy of the approach is significantly diminished due to PVT-induced variations in the signal/circuits. More importantly, none of the aforementioned approaches facilitate fly-height monitoring and control during normal operation write operations.

Hence, for at least the aforementioned reasons, there exists a need in the art for advanced systems and methods for determining fly-height.

BRIEF SUMMARY OF THE INVENTION

The present inventions are related to systems and methods for accessing a storage medium, and more particularly to systems and methods for determining the location of a read/write head assembly in relation to a storage medium.

Various embodiments of the present invention provide methods for adaptively adjusting fly-height. Such methods include providing a storage medium that includes information corresponding to a process data set, and a read/write head assembly that is disposed a variable distance from the storage medium. The process data set is accessed from the storage medium. A first channel bit density estimate is adaptively calculated based at least in part on the process data set and a second channel bit density estimate that was previously calculated. The variable distance is modified based at least in part on the first channel bit density estimate. A third channel bit density is adaptively calculated based at least in part on the process data set and a fourth channel bit density estimate that was previously calculated. The variable distance is modified based at least in part on the third channel bit density estimate.

In various instances of the aforementioned embodiments, the process data set is user data. As used herein, the phrase "user data" is used in its broadest sense to mean any data stored to a storage medium by a user and intended for use for more than just CBD estimation. Thus, user data may be, for example, data written to a storage medium by a user application and intended for later retrieval by the same application. In some instances of the aforementioned embodiments, accessing the process data set from the storage medium is done in parallel to another operation involving the storage medium. In particular cases, the aforementioned other operation involving the storage medium is a user application utilizing the process data set.

In some instances of the aforementioned embodiments, modifying the variable distance based at least in part on the first channel bit density estimate and the second channel bit density estimate includes modifying a temperature of the read/write head assembly. In such instances, modifying the temperature of the read/write head assembly includes: converting the first channel bit density estimate to a corresponding power value; and delivering a power output to the read/write head assembly corresponding to the power value.

In various instances of the aforementioned embodiments, accessing the process data set from the storage medium includes performing an analog to digital conversion on the information corresponding to the process data set to create a series of digital samples, and performing a data detection on the series of digital samples to create a series of detected samples. In such instances, the process data set includes both the series of digital samples and the series of detected samples.

In some instances of the aforementioned embodiments, adaptively calculating a first channel bit density estimate includes: performing a channel model calculation using a channel model calculation circuit, and based at least in part on the series of detected samples and the second channel bit density; and subtracting an output derived from the channel model calculation circuit from the series of digital samples yield an error signal. In some such instances, the third channel bit density estimate is calculated based at least in part on the error signal, the series of digital samples, the series of detected samples, and the fourth channel bit density estimate.

Other embodiments of the present invention provide continuous fly-height adjustable storage systems. Such systems include a storage medium, a read/write head assembly disposed a variable distance from the storage medium, an adaptive CBD estimation circuit, and a fly-height adjustment circuit. The storage medium includes information corresponding to a process data set. The adaptive CBD estimation circuit computes a series of CBD estimates based at least in part on preceding CBD estimates and the process data set, and the fly-height adjustment circuit is operable to modify the variable distance based on one or more of the series of CBD estimates.

In some instances of the aforementioned embodiments, the fly-height adjustment circuit implements thermal fly-height control. In some such instances, the thermal fly-height control involves converting a subset of the CBD estimates into respective power values each calculated to modify the temperature of the read/write head assembly such that the variable distance is predictably changed. In various instances of the aforementioned embodiments, the fly-height adjustment circuit includes: a first conversion circuit that converts a subset of the series of CBD estimates into respective fly-height conversion values; and a second conversion circuit that converts the respective fly-height conversion values into respective power values each calculated to modify the temperature of the read/write head assembly such that the variable distance is predictably changed.

In one or more instances of the aforementioned embodiments, the adaptive CBD estimation circuit includes a read channel circuit that has an analog to digital converter and a data detector. The analog to digital converter receives an analog signal corresponding to the process data set and provides a series of digital samples corresponding to the analog signal. The data detector receives the series of digital samples and provides a series of detected samples based on the series of data samples. In such instances, process data set includes the series of digital samples and the series of detected samples. In various cases, the adaptive CBD estimation circuit includes a channel model calculation circuit. The channel model calculation circuit receives the series of detected samples and the first channel bit density estimate, and provides a channel model output based at least in part on the series of detected samples and the first channel bit density estimate. The adaptive CBD estimation circuit further includes a summation circuit that is operable to subtract an output derived from the channel model calculation circuit from the series of digital samples to yield an error signal.

Yet other embodiments of the present invention provide hard disk drive systems that include a storage platter having information corresponding to a process data set. The process data set is usable for both a user application and a fly-height adjustment calculation. The hard disk drive systems further include a read/write head assembly disposed a variable distance from the storage platter, a read channel circuit, a channel model calculation circuit, a summation circuit, an adaptive CBD calculation circuit, and a fly-height adjustment circuit. The read channel circuit includes an analog to digital converter and a data detector. The analog to digital converter receives an analog signal corresponding to the process data set maintained on the storage medium and provides a series of digital samples corresponding to the analog signal, and the data detector receives the series of digital samples and provides a series of detected samples based on the series of data samples. The channel model calculation circuit receives the series of detected samples and a first channel bit density estimate, and provides a channel model output based at least in part on the series of detected samples and the first channel bit density estimate. The summation circuit is operable to subtract an output derived from the channel model calculation circuit from the series of digital samples to yield an error signal. The adaptive CBD calculation circuit calculates a second channel bit density estimate based at least in part on an output derived from the channel model output, the error signal, the series of digital samples, and the series of detected samples. The fly-height adjustment circuit is operable to modify the variable distance based on the second channel bit density estimate.

This summary provides only a general outline of some embodiments of the invention. Many other objects, features, advantages and other embodiments of the invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

The present inventions are related to systems and methods for accessing a storage medium, and more particularly to systems and methods for determining the location of a read/write head assembly in relation to a storage medium.

Various embodiments of the present invention provide a scheme that facilitates continuous monitoring and control of the fly-height using an adaptive approach for tracking variations in channel bit density (CBD). It has been determined that fly-height is monotonically related to CBD in a linear or nonlinear fashion. Thus, by tracking variations in CBD, variations in fly-height can be detected. Using the approach, a signal read back from a storage medium is digitized using an analog to digital converter, and from there is linearized through use of a current estimate of the CBD in a known model of the linear channel in conjunction with the data-bits available from a read channel detector output. An adaptive algorithm is applied to minimize the linearization error, and updates the current CBD estimate using the instantaneous value of the gradient of the linearization error. In some cases, the adaptive algorithm begins with a default choice for the CBD estimate, which is later updated as better information becomes available.

Among other things, such an approach provides an ability to continuously update the CBD estimate, and to continuously monitor any variation in fly-height. The variation of the CBD and fly-eight can be estimated on a sample by sample basis, and to provide corresponding control of fly-height. In some cases, the approach is less susceptible to PVT-induced variations when compared with other approaches. In addition, CBD estimation in accordance with some embodiments of the present invention may be performed during read operations. Further, in some instances of the aforementioned embodiments, the CBD obtained may be used independent of determining fly-height. For example, such CBD estimates may be used to characterize the read/write head assembly and/or the storage medium and to optimize the read channel.

Figure 1A:
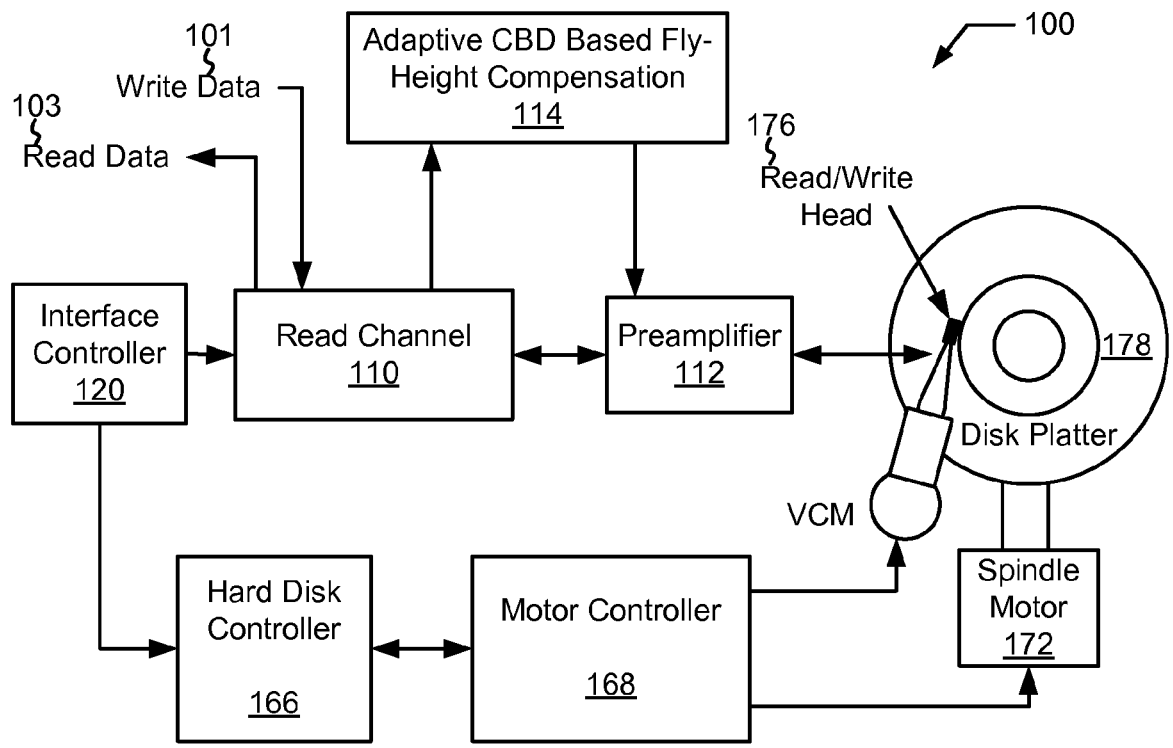
FIG. 1A depicts a storage system including an adaptive CBD based fly-height compensation circuit in accordance with various embodiments of the present invention.

Turning to FIG. 1A, a storage system 100 including an adaptive CBD based fly-height compensation circuit 114 is shown in accordance with various embodiments of the present invention. Storage system 100 may be, for example, a hard disk drive. In addition, storage system 100 includes an interface controller 120, a preamplifier 112, a hard disk controller 166, a motor controller 168, a spindle motor 172, a disk platter 178, and a read/write head assembly 176. Interface controller 120 controls addressing and timing of data to/from disk platter 178. The data on disk platter 178 consists of groups of magnetic signals that may be detected by read/write head assembly 176 when the assembly is properly positioned over disk platter 178. In a typical read operation, read/write head assembly 176 is accurately positioned by motor controller 168 over a desired data track on disk platter 178. Motor controller 168 both positions read/write head assembly 176 in relation to disk platter 178 and drives spindle motor 172 by moving read/write head assembly to the proper data track on disk platter 178 under the direction of hard disk controller 166. Spindle motor 172 spins disk platter 178 at a determined spin rate (RPMs). A read channel circuit 110 receives information from preamplifier 112 and performs a data decode/detection process as is known in the art to recover the data originally written to disk platter 178 as read data 103. In addition, read channel circuit 110 receives write data 101 and provides it to preamplifier 112 in a form writable to disk platter 178 as is known in the art.

Figure 1B:
FIG. 1B depicts a read/write head assembly disposed in relation to a storage medium as a way to graphically display fly-height.

Adaptive CBD based fly-height compensation circuit 114 receives the detected data from read channel circuit 110 along with an analog to digital conversion of the pre-detected data from preamplifier 112. Using this information, adaptive CBD based fly-height compensation circuit 114 adaptively computes CBD values, converts the CBD values to fly-height compensation values and provides the fly-height compensation values to read/write head assembly 176 via preamplifier 112 to adjust the fly-height. FIG. 1B depicts an exemplary fly-height 195, which is the distance between read/write head assembly 176 and disk platter 178.

In operation, read/write head assembly 178 is positioned adjacent the proper data track, and magnetic signals representing data on disk platter 178 are sensed by read/write head assembly 176 as disk platter 178 is rotated by spindle motor 172. The sensed magnetic signals are provided as a continuous, minute analog signal representative of the magnetic data on disk platter 178. This minute analog signal is transferred from read/write head assembly 176 to read channel circuit 110 via preamplifier 112. Preamplifier 112 is operable to amplify the minute analog signals accessed from disk platter 178. In addition, preamplifier 112 is operable to amplify data from read channel circuit 110 that is destined to be written to disk platter 178. In turn, read channel circuit 110 decodes and digitizes the received analog signal to recreate the information originally written to disk platter 178. This data is provided as read data 103 to a receiving circuit. A write operation is substantially the opposite of the preceding read operation with write data 101 being provided to read channel module 110. This data is then encoded and written to disk platter 178. During the read and write processes (or during an offline time period), adaptive CBD based fly-height compensation circuit 114 detects variations in the CBD and provides corresponding fly-height adjustments.

Figure 2:
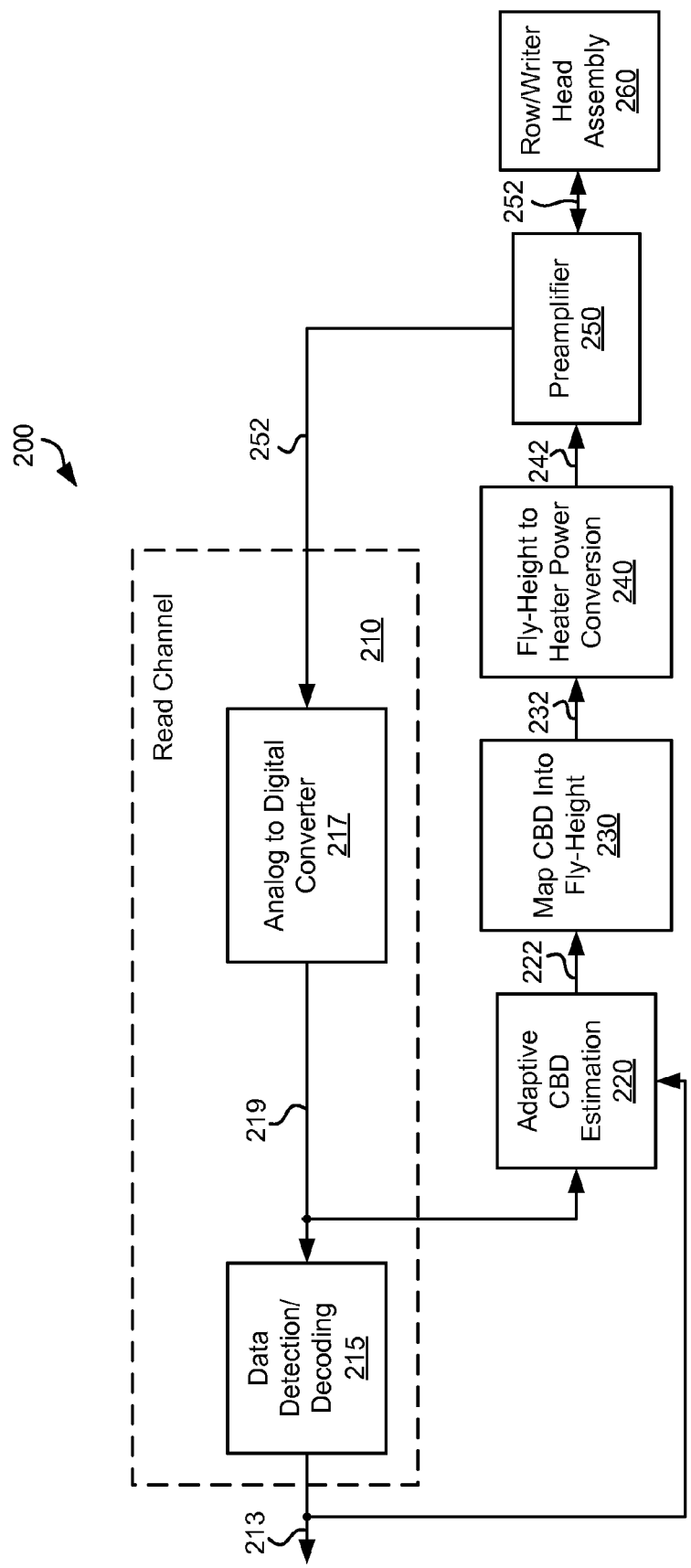
FIG. 2 is a block diagram of an adaptive CBD estimation and fly-height adjustment system 200 in accordance with various embodiments of the present invention.

Turning to FIG. 2, a block diagram of an adaptive CBD estimation and fly-height adjustment system 200 is depicted in accordance with various embodiments of the present invention. Adaptive CBD estimation and fly-height adjustment system 200 includes a read channel circuit 210. Read channel circuit 210 may be implemented in accordance with different read channel circuits known in the art. In this particular embodiment of the present invention, read channel circuit 210 includes an analog to digital converter 217 and a data detection/decoding circuit 215. It should be noted that an analog front end (not shown) may be implemented between preamplifier 250 and analog to digital converter 217. Such an analog front end performs various signal conditioning functions as are known in the art. Analog to digital converter 217 may be any circuit capable of converting an analog input signal 252 into a series of digital samples 219 corresponding to the analog input. Data detection/decoding circuit 215 may be any detector/decoder or combination thereof that is capable of receiving digital samples 219 and detecting a data pattern 213 therefrom. Based on the disclosure provided herein, one of ordinary skill in the art will recognize a variety of read channel circuits, analog to digital converters, and/or data detection/decoding circuits that may be used in accordance with different embodiments of the present invention.

In addition, adaptive CBD estimation and fly-height adjustment system 200 includes an adaptive CBD estimation circuit 220 that receives digital samples 219 along with a corresponding detected data set 213 that is provided by data detection/decoding circuit 215. Adaptive CBD estimation circuit 220 adaptively calculates a CBD value 222 corresponding to the received data. Adaptive CBD estimation circuit 220 receives samples on a bit by bit basis and is able to continuously update CBD value 222 on each clock cycle where desired, or on some less frequent basis where such is desired. In some cases, the data used to calculate CBD value 222 is derived from user data retrieved from a storage medium (not shown). In general, adaptive CBD estimation circuit 220 models digital samples 219 using a channel model that is parameterized to use a prior CBD estimate. Based on this, an updated CBD value 222 is generated by minimizing the mean-square error between digital samples 219 and the output samples of the channel model.

CBD value 222 is provided to a conversion circuit 230 that maps CBD value 222 into a corresponding fly-height offset value 232. As variations in fly-height correspond to variations in CBD, the aforementioned mapping implements a correlating function. In some embodiments of the present invention, the function is a linear or non-linear function that correlates CBD value 222 to fly-height offset value 232. Fly-height offset value 232 is provided to a series of circuits capable of implementing thermal fly-height control as is known in the art. Such circuits may include a fly-height heater power conversion circuit 240 that converts fly-height offset value 232 into a power offset 242 as is known in the art. Power offset 242 is provided to a preamplifier circuit 250 that incorporates power offset value 242 into a heater value 252 as is known in the art. Heater value 252 is provided to a read/write head assembly 260, which is modified based on heater value 252 to adjust the distance of read/write head assembly to an associated storage medium as is known in the art. Based on the disclosure provided herein, one of ordinary skill in the art will recognize a variety of approaches, circuits, and/or methodologies that may be used or controlling the fly-height based on the information provided by the CBD estimation circuit of system 200.

Figure 3:
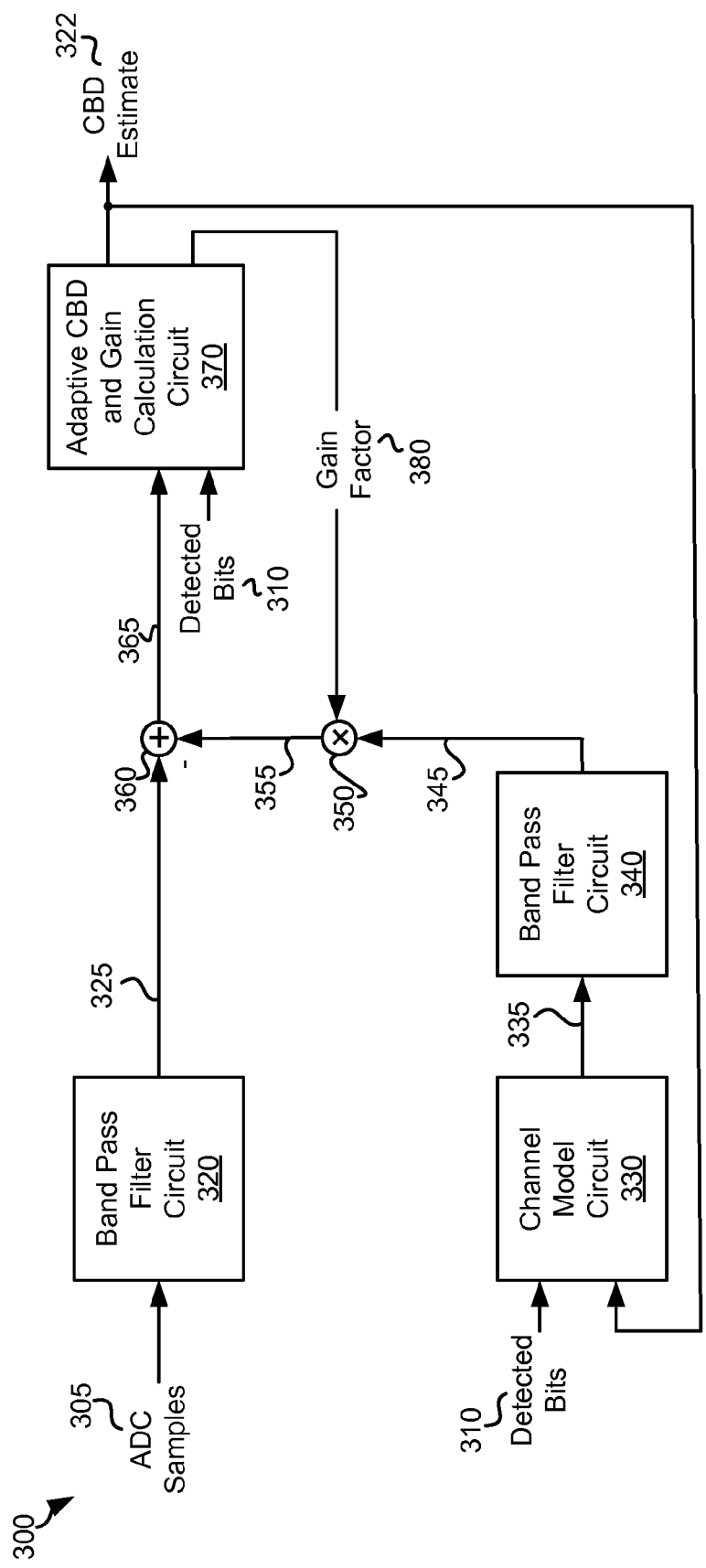
FIG. 3 is a detailed block diagram of an adaptive CBD estimation circuit in accordance with one or more embodiments of the present invention.

Turning to FIG. 3, a block diagram of an adaptive CBD estimation circuit 300 is shown in accordance with various embodiments of the present invention. Adaptive CBD estimation circuit 300 provides a series of CBD estimates 322, z[n], corresponding to the received data. Adaptive CBD estimation circuit 300 receives digital samples 305 from an analog to digital converter (not shown), and detected bits 310 from a data decoder/detection circuit (not shown). Digital samples 305 and detected bits 310 each correspond to an analog signal derived from a storage medium. Digital samples 305 are provided to a band pass filter 320 that attenuates the signal and noise outside the defined filter bandwidth from digital samples 305 and provides an output 325, x[n]. Band pass filter 320 may be any digital band pass filter known in the art. In some embodiments of the present invention, the corner frequencies of band pass filter 320 are chosen such that the lower corner is higher than an AC coupler circuit used to receive the input signal, and the higher corner is lower than that of a continuous time filter receiving the input signal. Such design constraints increase the robustness to variations in the roll-off regions of front end analog filters.

Detected bits 310, a[n], are provided to a channel model circuit 330 along with a CBD estimate 322, W[n−1], from a preceding period. Channel model 330 provides an estimation 335, $y_0[n]$, of the response of the channel in accordance with the following equation:

$$y_0[n] = \sum_{m=-M}^{M} h_b[m, n]a[n-m],$$

where $h_b[m, n]$ denotes the bit response of the channel parameterized by the CBD estimate, W[n], and represented by the following equations:

$$h_b[m, n] = h_s[m, n] - h_s[m-1, n],$$

and $$h_s[m, n] = \mathrm{erf}\left(2\sqrt{\ln 2}\, \frac{m}{W[n]}\right),$$

for $m = 0, +/-1, +/-2, \ldots, +/-M$.

where $h_s[m, n]$ denotes the step response, erf is an error function, M is an integer, and 2M+1 is the length of the channel bit response. In some embodiments of the present invention, the CBD is defined as the ratio of the width of the impulse response of the channel at fifty percent of its peak amplitude to the duration of one bit on the storage medium associated with adaptive CBD estimation circuit 300. Channel model output 335 is provided to a band pass filter 340 that attenuates the signal and noise outside the defined filter bandwidth from digital samples 335 and provides an output 345, $\tilde{d}[n]$. Band pass filter 340 may be any digital band pass filter known in the art. In some embodiments of the present invention, the corner frequencies of band pass filter 340 are chosen to match any continuous time filter and/or AC coupling circuit used to receive the input signal, or similar to the corner frequencies of band pass filter 320. Output 345 is represented by the following equation:

$$\tilde{d}[n] = \sum_k q[k]y_0[n-k],$$

where q[k] denotes the impulse response of band pass filter 340, and $y_0[n]$ denotes output 335 of the channel model.

A time varying gain factor 380, A[n], is applied to output 345 using a multiplication circuit 350 to yield an output 355 in accordance with the following equation:

$$d[n] = A[n] * \tilde{d}[n].$$

Gain factor 380 provides robustness against gain variations in the analog to digital converter. In particular, gain factor 380 is adaptively adjusted to follow the amplitude in the signal at the output of the analog to digital converter. Output 355 is subtracted from output 325 using a summation circuit 360 to yield an error signal 365, e[n], in accordance with the following equation:

$$e[n] = x[n] - d[n] = x[n] - A[n] * \tilde{d}[n].$$

An adaptive CBD and gain calculation circuit 370 receives error signal 365 and detected bits 310. Using these inputs, adaptive CBD and gain calculation circuit 370 estimates CBD 322 and gain factor 380 by minimizing the mean-square value of error signal 365. This is done adaptively by using an instantaneous gradient based least mean-square algorithm that is known in the art. The gradients are defined by the following equations:

$$\frac{\partial e[n]}{\partial W} = -A \sum_k \sum_m b[n-k]h_w[m]q[k-m]$$
$$\equiv -A y_2[n]$$
$$\equiv -y_3[n],$$

$$\frac{\partial e[n]}{\partial A} = -\tilde{d}[n],$$

$$h_w[m] = \frac{\partial h_s[m]}{\partial W}$$
$$= -4\sqrt{\frac{\ln 2}{\pi}} * \frac{m}{W^2} * \exp\left(-4\ln 2\, \frac{m^2}{W^2}\right),$$

and $$b[n] = a[n] - a[n-1].$$

In the aforementioned equations, b[n] denotes the transition sequence equal to a logic '1' when a transition occurs and a logic '0' where no transition is indicated, and $h_w[m]$ denotes the width response of the channel parameterized by the CBD, W. In some embodiments of the present invention, the computational complexity is reduced and error propagation from fixed point circuit implementation is limited by choosing band pass filters 320, 340 to be finite impulse response filters with 2L+1 taps. The transfer function of the band pass filters is defined by the following equation:

$$H(z) = \sum_{-L}^{L} \Theta[i] z^{-1},$$

where $\Theta[i]$ denotes the coefficients of the finite impulse response filter.

The aforementioned equations may be used adaptively such that a progressively more accurate CBD estimation 322 is achieved. The following equations represent the algorithm of adaptive CBD estimation circuit 300 modified for adaptive operation.

$$h_s[m, n] = \text{erf}\left(2\sqrt{\ln 2} \, \frac{m}{W[n]}\right), \quad (1a)$$
for $m = 0, +/-1, +/-2, \ldots, +/-M,$ $$h_b[m, n] = h_s[m, n] - h_s[m-1, n], \quad (1b)$$

$$h_w[m] = -4\sqrt{\frac{\ln 2}{\pi}} * \frac{m}{W^2} * \exp\left(-4\ln 2 \frac{m^2}{W^2}\right), \quad (1c)$$

$$x[n] = \sum_{i=-L}^{L} \Theta[i] z[n-i], \quad (1d)$$

$$b[n] = a[n] - a[n-1], \quad (1e)$$

$$y_0[n] = \sum_{m=-M}^{M} h_b[m, n] a[n-m], \quad (1f)$$

$$\tilde{d}[n] = \sum_{i=-L}^{L} \Theta[i] y_0[n-i], \quad (1g)$$

$$e[n] = x[n] - A[n] * \tilde{d}[n], \quad (1h)$$

$$y_1[n] = \sum_{m=-M}^{M} h_w[m, n] b[n-m], \quad (1i)$$

$$y_2[n] = \sum_{m=-L}^{L} \Theta[i] y_1[n-i], \quad (1j)$$

$$y_3[n] = A[n] * y_2[n], \quad (1k)$$

$$W[n+1] = W[n] + \mu_1 * e[n] * y_3[n], \quad (1l)$$
and
$$A[n+1] = A[n] + \mu_2 * e[n] * \tilde{d}[n]. \quad (1m)$$

The aforementioned equations describe various operations of the circuits of adaptive CBD estimation circuit 300. In particular, x[n] describes output 325 from band pass filter 320, $y_0$[n] describes output 335 from channel model circuit 330, d[n] describes output 345 from band pass filter 340, A[n+1] describes an adaptively updated gain factor 380 and W[n+1] describes and adaptively updated CBD estimate 322 from adaptive CBD and gain calculation circuit 370, and e[n] describes error signal 365 from summation circuit 360. $y_1$[n] is the output of a width response model implemented as part of adaptive CBD and gain calculation circuit 370, $y_2$[n] is a filtered version of $y_1$[n], and $y_3$[n] is a gain adjusted version of $y_2$[n]. $\mu_1$ and $\mu_2$ are settable gain values that control the speed of the adaptive loop.

It should be noted that while various components of adaptive CBD estimation circuit 300 are described as "circuits" they may be implemented either as an electronic circuit or as a software/firmware circuit. Such software/firmware circuits include a processor associated with a memory device that includes instructions executable by the processor to perform the particular functions described herein. Such processors may be general purpose processors or processors specifically tailored to perform a given function depending upon the particular implementation requirements. In some cases, the processor may be designed to perform functions related to more than one particular module. In some embodiments of the present invention, adaptive CBD estimation circuit 300 is implemented entirely as firmware or software being executed by a processor. In other embodiments of the present invention, adaptive CBD estimation circuit 300 is implemented entirely as a dedicated electronic circuit. In yet other embodiments of the present invention, adaptive CBD estimation circuit 300 is implemented as a combination of firmware or software being executed on a processor, and dedicated electronic circuitry. Based on the disclosure provided herein, one of ordinary skill in the art will recognize a variety of combinations of dedicated electronic circuitry and software/firmware that may be used in accordance with different embodiments of the present invention.

Figure 4:
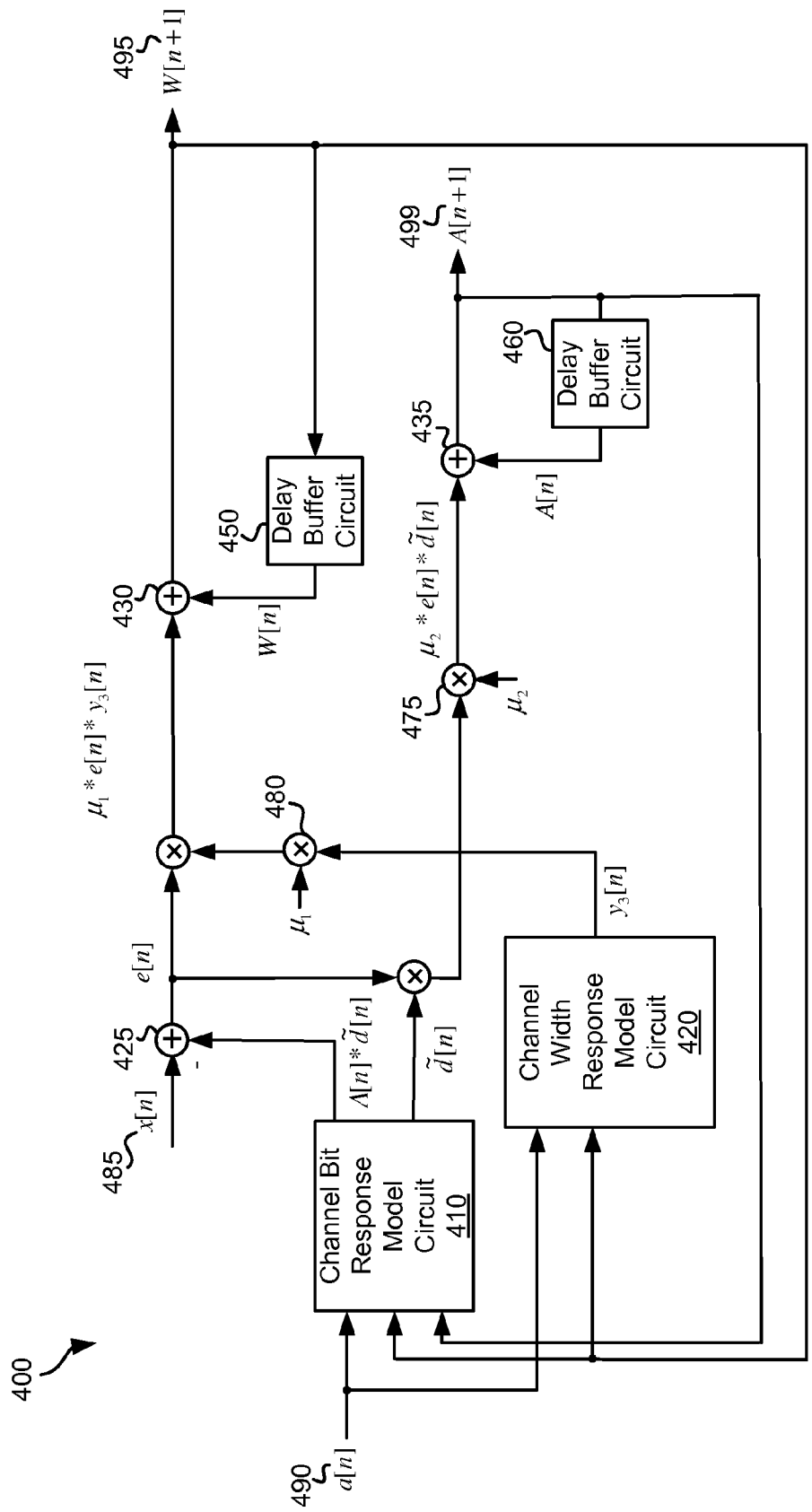
FIG. 4 shows an implementation of an adaptive CBD and gain calculation circuit in accordance with various embodiments of the present invention.

Turning to FIG. 4, an implementation of an adaptive CBD and gain calculation circuit 400 is shown in accordance with various embodiments of the present invention. Adaptive CBD and gain calculation circuit 400 includes a channel bit response model circuit 410, a channel width response circuit 420, summation circuits 425, 430, 435, delay buffer circuits 450, 460, and multiplication circuits 470, 475, 480. Adaptive CBD and gain calculation circuit 400 receives a series of digital samples 485 from an analog to digital converter (not shown), a series of detected samples 490 from a data detector (not shown), and provides an updated CBD estimate 495 and an updated gain factor 499. In some embodiments of the present invention, the digital samples from the analog to digital converter may go through a series of circuits intended for conditioning the digital samples to improve the accuracy and robustness of the CBD estimation circuit. Examples of these special circuits include the band pass filter 320 and circuits such as temperature compensation filter and phase compensation filter that are discussed later in this invention. The function of each of the various circuits is described mathematically with an equation associated with the output of each of the circuits.

Similar to adaptive CBD estimation circuit 300, it should be noted that while various components of adaptive CBD and gain calculation circuit 400 are described as "circuits" that they may be implemented either as an electronic circuit or as a software/firmware circuit. Such software/firmware circuits include a processor associated with a memory device that includes instructions executable by the processor to perform the particular functions described herein. Such processors may be general purpose processors or processors specifically tailored to perform a given function depending upon the particular implementation requirements. In some cases, the processor may be designed to perform functions related to more than one particular module. In some embodiments of the present invention, adaptive CBD and gain calculation circuit 400 is implemented entirely as firmware or software being executed by a processor. In other embodiments of the present invention, adaptive CBD and gain calculation circuit 400 is implemented entirely as a dedicated electronic circuit. In yet other embodiments of the present invention, adaptive CBD and gain calculation circuit 400 is implemented as a combination of firmware or software being executed on a processor, and dedicated electronic circuitry. Based on the disclosure provided herein, one of ordinary skill in the art will recognize a variety of combinations of dedicated electronic circuitry and software/firmware that may be used in accordance with different embodiments of the present invention.

Various modifications to the previously described circuits may be implemented to improve estimation accuracy and operational robustness. From equations (1a and 1c) it is noted that special functions erf(x) and exp(x) have to be computed for 2M+1 values of x at each sample instant n. Evaluation of these special functions, especially erf(x), can be complicated in a hardware implementation. Thus, some embodiments of the present invention utilize other models for the channel. In one such case, a hyperbolic tangent model is used that reduces the complexity of a hardware implementation. Such a hyperbolic tangent model is based on an isolated step-response and width responses as set forth in the following equations:

$$h_s[m] = \tan h(\alpha * m/W_1), \text{ for } m=0, \pm 1, \pm 2, \ldots, \pm M, \text{ and}$$

$$h_w[m] = -\alpha * m/W_1^2 \sec h^2(\alpha * m/W_1),$$

where $\alpha$ is a constant and $W_1$ is related to the CBD in accordance with the following equation:

$$CBD = \frac{2\cosh^{-1}(\sqrt{2})}{\alpha} W_1.$$

In some cases, $\alpha$ has a value of log(3) or $\pi$.

To simplify the discussion, let $$\tilde{W} = W_1/\alpha_1.$$

Using the aforementioned simplification along with the identity $\sec h^2(x) = 1 - \tan h^2(x)$, the step and width response can be re-written as:

$$h_s[m] = \tanh(m/\tilde{W}) = \frac{1 - \exp(-2m/\tilde{W})}{1 + \exp(-2m/\tilde{W})}, \quad (2a)$$

$$\text{for } m = 0, +/-1, +/-2, \ldots, +/-M,$$

$$h_w[m] = -\frac{m}{\tilde{W}^2} \sec h^2(m/\tilde{W}) \quad (2b)$$

$$= -\frac{m}{\tilde{W}^2}(1 - \tanh^2(m/\tilde{W}))$$

$$= -\frac{m}{\tilde{W}^2}(1 - h_s^2[m]),$$

and $$CBD = 2\cosh^{-1}(\sqrt{2}) * \tilde{W}. \quad (2c)$$

In addition, the following symmetry properties may be used for m=0, 1, 2, ..., M:

$$h_s[m] = -h_s[-m], \text{ with } h_s[0]=0, \quad (3a)$$

$$h_w[m] = -h_w[-m], \text{ with } h_w[0]=0, \quad (3b)$$

$$h_b[m] = h_b[1-m], \text{ with } h_b[-M]0, \text{ and} \quad (3c)$$

$$\tilde{h}_w[m] = \tilde{h}_w[1-m], \text{ with } \tilde{h}_w[-M]=0, \quad (3d)$$

where $\tilde{h}_w[m]$ is a modified form of the width response given by:

$$\tilde{h}_w[m] = h_w[m] - h_w[m-1].$$

Thus, by using the hyperbolic tangent model, evaluation of only one special function, exp(x), to compute the step and width responses. Further, by using the hyperbolic tangent model, only the step-response needs to be calculated directly as the width-response can be computed from the step response using equation (2b). The adaptive algorithm may be set-up to estimate the scaled CBD value, $\tilde{W}$. The actual CBD value, W, can be obtained by scaling the estimated CBD value in accordance with equation (2c). As demonstrated by equations (3), the step-response and width-response are odd-symmetric. Because of this, $h_s[m]$ and $h_w[m]$ only need to be evaluated for m=1, 2, ..., M.

Hardware complexity may be further reduced by indirectly computing the special function tan h(m/$\tilde{W}$) through use of a second order polynomial fit for evaluating tan h(m/$\tilde{W}$) for each value of m and $\tilde{W}$. This process is done by first dividing the range of $\tilde{W}$ into two sections given by:

$$R_1 = \{\tilde{W}: \tilde{W}_1 \leq \tilde{W} \leq \tilde{W}_2\} \text{ and } R_2 = \{\tilde{W}: \tilde{W}_2 < \tilde{W} \leq \tilde{W}_3\}.$$

From this point, 2M second order polynomials are determined that best fit tan h(m/$\tilde{W}$) in the regions $R_1$ and $R_2$, for each value m=1,2, ..., M. Let $\{p_{m,1}[2], p_{m,1}[1], p_{m,1}[0]\}$ and $\{p_{m,2}[2], p_{m,2}[1], p_{m,2}[0]\}$ be the polynomials for each m=1, 2, ..., M. From this, the following estimation for the value of tan h(m/$\tilde{W}$) is achieved:

$$\tan h(m/\tilde{W}) = p_{m,1}[2]\tilde{W}^2 + p_{m,1}[1]\tilde{W} + p_{m,1}[0], \text{ for } \tilde{W} \in R_1, \text{ and}$$

$$\tan h(m/\tilde{W}) = p_{m,2}[2]\tilde{W}^2 + p_{m,2}[1]\tilde{W} + p_{m,2}[0], \text{ for } \tilde{W} \in R_2.$$

Based on the disclosure provided herein, one of ordinary skill in the art will recognize a variety of approaches, such as polynomial fitting of different orders and applying this over different number of segments of the total range of CBD, for efficiently computing the special function tan h(·) that may be utilized in accordance with different embodiments of the present invention.

Hardware complexity may be further reduced by relying on the nature of a[n] and b[n]. In particular, the data bits a[n] are binary valued (i.e., a[n] ∈ {−1,1}) and data transitions b[n] are ternary valued (i.e., b[n] ∈ {−2,0,2}). Based on this, the computation of model outputs, $y_0[n]$ and $y_1[n]$, can be done using only additions. Using this and the symmetry of $h_b[m]$ and $\tilde{h}_w[m]$ set forth in equations (3), the model outputs $y_0[n]$ and $y_1[n]$ can be expressed as:

$$y_0[n] = \sum_{m=-M}^{M} h_b[m,n]a[m-n] = 2\sum_{m \in A_n} h_b[m,n]a[n-m],$$

and $$y_1[n] = \sum_{m=-M}^{M} h_w[m,n]b[n-m] = 2\sum_{m \in A_n} \tilde{h}_w[m,n]a[n-m].$$

In the preceding equations, $A_n$, is a subset of the index set {1, 2, ..., M−1, M} such that a[n−m]=a[n+m−1].

It is further noted that the coefficients of band pass filters 320, 340 are even symmetric, such that, $\Theta[i] = \Theta[-i]$, for i=1, 2, ..., L with $\Theta[0]$ being the main coefficient. As an example, by choosing L=10 and the lower and upper cutoff frequencies as 1% of the channel data rate and 25% of the channel data rate, respectively, after quantizing using, for example, eight bits, the coefficients are such that:

| | |
|---|---|
| $\Theta[2] = \Theta[4] + 2\Theta[8]$, | $\Theta[3] = 8\Theta[4] + 2\Theta[8]$, |
| $\Theta[5] = -2\Theta[4]$, | $\Theta[6] = 2\Theta[8]$, |
| $\Theta[7] = 4\Theta[8]$, | $\Theta[9] = \Theta[10] = 0.$ |

Exploiting the aforementioned relationships, the number of multiplications required for computing one sample of the filter output can be reduced to four. For example, output 325 can be computed as:

$$x[n] = \sum_{i=-10}^{10} \Theta[i]z[n-i]$$

$$= \Theta[i]z[n] + \sum_{i=1}^{10} \Theta[i]z_i[n]$$

$$= \Theta[0]z[n] + \Theta[1]z_1[n] +$$
$$\Theta[4](z_2[n] + 8z_3[n] + z_4[n] - 2z_5[n]) +$$
$$\Theta[8](2z_2[n] + 2z_3[n] + 2z_6[n] + 4z_7[n] + z_8[n])$$

where $z_i[n] = z[n-i] + z[n+i]$.

In the least mean-squared algorithm, the instantaneous gradient used for updating the parameter(s) is the product of the error, e[n], and the gradient of the error with respect to the parameter(s) being updated. An approach to simplify the computational complexity of this adaptive algorithm is to replace either one or both of these components by their signs. The error term may be kept as such, while the gradient of the error is replaced with its sign. Applying this principle to equations (1l and 1m), the following is obtained:

$$W[n+1] = W[n] + \mu_1 * e[n] * sgn(y_2[n]), \text{ and}$$

$$A[n+1] = A[n] + \mu_2 * e[n] * sgn(\tilde{d}[n]).$$

The term sgn(x) denotes the sign of x. Next, since the sign of $y_2[n]$ is not affected by division by $\tilde{W}^2$, the factor can be dropped resulting in $h_w[m] = -m(1 - h_s^2[m])$. Further, since only the sign of $y_2[n]$ is required in the adaptation algorithm, the accuracy required in computing the width response, $h_w[m, n]$, can be relaxed. For the sake of additional reduction in computational complexity, the width response may be fixed to the average of the width response over a given CBD range.

Further, through simulation it was determined that there is a reasonable correlation between the sign at the input of band pass filters 320, 340, and the sign at the output thereof. Said another way, there may be a strong correlation between sgn $(\tilde{d}[n])$ and sgn($y_0[n]$), and between sgn($y_2[n]$) and sgn($y_1[n]$). Therefore, the adaptation equations for gain factor 380 and CBD estimate 322 may be re-written as follow:

$$W[n+1] = W[n] + \mu_1 * e[n] * sgn(y_1[n]), \text{ and}$$

$$A[n+1] = A[n] + \mu_2 * e[n] * sgn(y_0[n]).$$

Using the preceding equations for adaptively calculating CBD and gain leads to the following simplifications. First, as $\tilde{d}[n]$ is no longer required, band pass filters 320, 340 can be shifted to the output of summation circuit 360 (see equations (1d and 1g)). Next, because $y_2[n]$ and $y_3[n]$ are no longer required, the band pass filter used to create $y_2[n]$ in the width response path of FIG. 4 can be eliminated (see equations (1j and 1k)).

In certain embodiments of the present invention, computational complexity is reduced by replacing the channel bit response, $h_b[m]$, with the convolution of band pass filter 340 and bit response $h_b[m]$, and by replacing the channel width response, $h_w[m]$, with the convolution of band pass filter 340 and width response $h_w[m]$. In this case, the channel model outputs correspond to d[n] and $y_2[n]$, respectively. In some embodiments of the present invention, the combined band pass filtered bit response is computed using a polynomial fitting approach similar to that described earlier.

It is also observed from FIG. 2 that the phase of the model output, d[n], will be a constant because the phase of bit-response, $h_b[m]$, is fixed. On the other hand, the phase of the analog to digital converter output, d[n], will depend on the equalization target and characteristics of the analog front-end. Consequently, the error signal, e[n], will contain a component arising from the phase-difference between the ADC output and the model output. This phase component will affect the performance of the adaptive algorithm. More importantly, this phase component will result in compromising the robustness of CBD estimation to variations in analog front end characteristics, despite the use of band pass filters. To counter this effect, a simple phase compensation approach may be employed. In particular, a first-order timing-recovery loop is used to track and compensate the phase-difference between the ADC output and the model output. As an example, let $\phi[n]$ be the phase difference at time instant n. A FIR interpolation filter can be used to phase-shift the ADC output to cancel the phase difference. The phase-shifted ADC output (say, q[n]) is used for generating the error signal in accordance with the following equations:

$$e[n] = q[n] - d[n],$$

and $$q[n] = \sum_{i=-Q}^{Q-1} g[i, n]x[n-i],$$

where g[i, n] denotes the interpolation filter corresponding to the phase, $\phi[n]$. The phase $\phi[n]$, can be estimated using a first order loop as:

$$\phi[n+1] = \phi[n] + \mu_3 * \epsilon[n], \text{ and}$$

$$\epsilon[n] = -e[n] * sgn(d[n] - d[n-1]),$$

where $\epsilon[n]$ is the phase detector output and $0 < \mu_3 < 1$ denotes a step-size parameter that controls the adaptation rate of the loop.

As can be observed from the preceding equations, implementation of the phase compensation block demands 2Q multiplications per bit. This can be prohibitive from both a power and area perspective since the FIR interpolation filter coefficients, g[i, n], change with time n. To compensate, some embodiments of the present invention utilize a Farrow structure based polynomial interpolation filter implementation. Second-order polynomials are adequate in some implementations. Using such an approach, the FIR interpolation filter output can be computed as:

$$q[n] = q_0[n] + q_1[n](2\phi[n] - 1) + q_2[n](2\phi[n] - 1)^2$$
$$= q_0[n] + (2\phi[n] - 1)[q_1[n] + q_2[n](2\phi[n] - 1)]$$

$$q_0[n] = \sum_{i=0}^{Q-1} f[i](x[n-i] + x[n+i+1])$$

$$q_1[n] = \frac{x[n+1] - x[n]}{2}$$

$$q_2[n] = \frac{x[n+1] + x[n]}{2} - q_0[n]$$

where f[i] are fixed coefficients independent of the phase $\phi[n]$. One advantage of this implementation is that only two multipliers need to change with n since the f[i] coefficients required for computing $q_0[i]$ remain fixed.

The characteristics of the analog front-end in the read channel circuit tend to vary with temperature. Two main parameters that affect the CBD estimation are the boost and cut-off frequencies of the analog front-end. When these parameters vary with temperature, the resulting CBD estimate will be different, which, in the absence of proper compensation, will lead to incorrect conclusion that fly-height has changed. In certain embodiments of the current invention, a short filter of 3-taps length is inserted at the output of the band pass filter 320 to compensate against variation in analog front-end parameters with temperature. The output of this temperature compensation filter is given by $$x_3[n] = \beta_0 x_2[n] + \beta_1 x_2[n-1] + \beta_2 x_2[n-2]$$

where $x_3[n]$ denotes the output of the temperature compensation filter, $x_2[n]$ denotes the output of the band pass filter 320, and $\{\beta_0, \beta_1, \beta_2\}$ denote the coefficients of the temperature compensation filter. In certain embodiments of this invention, the coefficient $\beta_0$ is set to 1.0 and the coefficients $\{\beta_1, \beta_2\}$ are tuned according to the environment. Based on the disclosure provided herein, one of ordinary skill in the art will recognize a variety of filtering approaches to compensate for environmental variations, which may be utilized in accordance with different embodiments of the present invention.

Figure 5:
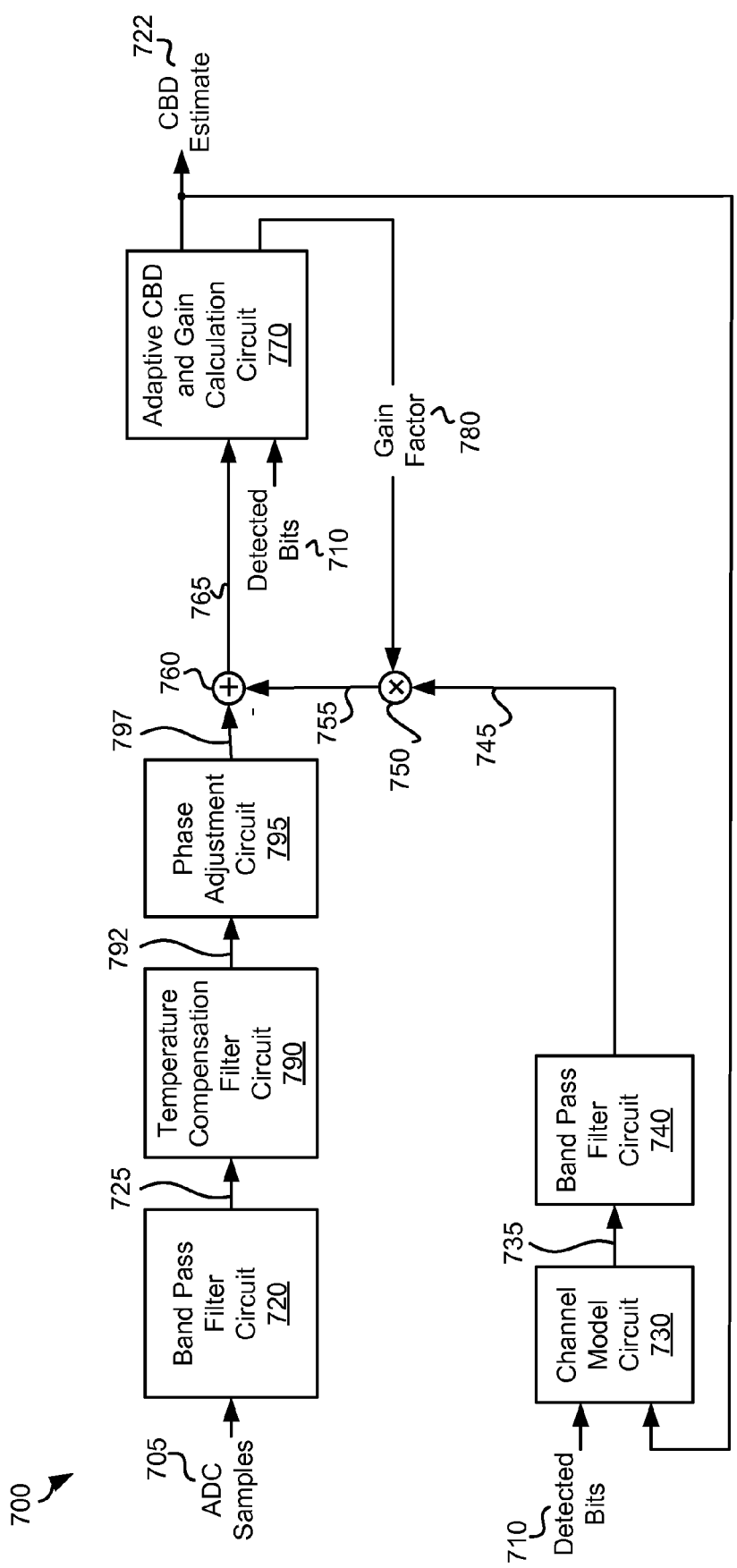
FIG. 5 is a detailed block diagram of an adaptive CBD estimation circuit in accordance with other embodiments of the present invention.

Turning to FIG. 5, a block diagram of an adaptive CBD estimation circuit 700 is shown in accordance with various embodiments of the present invention. Adaptive CBD estimation circuit 700 is similar to the previously described adaptive CBD estimation circuit 300, except that it includes a temperature compensation filter circuit 790 and a phase adjustment circuit 795. Adaptive CBD estimation circuit 700 provides a series of CBD estimates 722 corresponding to the received data. Adaptive CBD estimation circuit 700 receives digital samples 705 from an analog to digital converter (not shown), and detected bits 710 from a data decoder/detection circuit (not shown). Digital samples 705 and detected bits 710 each correspond to an analog signal derived from a storage medium. Digital samples 705 are provided to a band pass filter 720 that attenuates the signal and noise outside the defined filter bandwidth from digital samples 705 and provides an output 725. Output 725 is provided to temperature compensation circuit 790 that provides an output 792 that is a temperature compensated version of output 725. Output 792 is provided to a phase adjustment circuit 795 that performs an interpolation resulting in a phase adjusted output 797.

Detected bits 710 are provided to a channel model circuit 730 along with a CBD estimate 722 from a preceding period. Channel model 730 provides an estimation 735 of the response of the channel. In some embodiments of the present invention, the CBD is defined as the ratio of the width of the impulse response of the channel at fifty percent of its peak amplitude to the duration of one bit on the storage medium associated with adaptive CBD estimation circuit 700. Channel model output 735 is provided to a band pass filter 740 that attenuates the signal and noise outside the defined filter bandwidth from digital samples 735 and provides an output 745. Band pass filter 740 may be any digital band pass filter known in the art. In some embodiments of the present invention, the corner frequencies of band pass filter 740 are chosen to match any continuous time filter and/or AC coupling circuit used to receive the input signal, or similar to the corner frequencies of band pass filter 720.

A time varying gain factor 780 is applied to output 745 using a multiplication circuit 350 to yield an output 755. Gain factor 780 provides robustness against gain variations in the analog to digital converter. In particular, gain factor 780 is adaptively adjusted to follow the amplitude in the signal at the output of the analog to digital converter. Output 755 is subtracted from output 797 using a summation circuit 760 to yield an error signal 765. An adaptive CBD and gain calculation circuit 770 receives error signal 765 and detected bits 710. Using these inputs, adaptive CBD and gain calculation circuit 770 estimates CBD 722 and gain factor 780 by minimizing the mean-square value of error signal 765. This is done adaptively by using an instantaneous gradient based least mean-square algorithm that is known in the art. In some embodiments of the present invention, the computational complexity is reduced and error propagation from fixed point circuit implementation is limited by choosing band pass filters 720, 740 to be finite impulse response filters with 2L+1 taps.

It should be noted that while various components of adaptive CBD estimation circuit 700 are described as "circuits" they may be implemented either as an electronic circuit or as a software/firmware circuit. Such software/firmware circuits include a processor associated with a memory device that includes instructions executable by the processor to perform the particular functions described herein. Such processors may be general purpose processors or processors specifically tailored to perform a given function depending upon the particular implementation requirements. In some cases, the processor may be designed to perform functions related to more than one particular module. In some embodiments of the present invention, adaptive CBD estimation circuit 700 is implemented entirely as firmware or software being executed by a processor. In other embodiments of the present invention, adaptive CBD estimation circuit 700 is implemented entirely as a dedicated electronic circuit. In yet other embodiments of the present invention, adaptive CBD estimation circuit 700 is implemented as a combination of firmware or software being executed on a processor, and dedicated electronic circuitry. Based on the disclosure provided herein, one of ordinary skill in the art will recognize a variety of combinations of dedicated electronic circuitry and software/firmware that may be used in accordance with different embodiments of the present invention.

Figure 6:
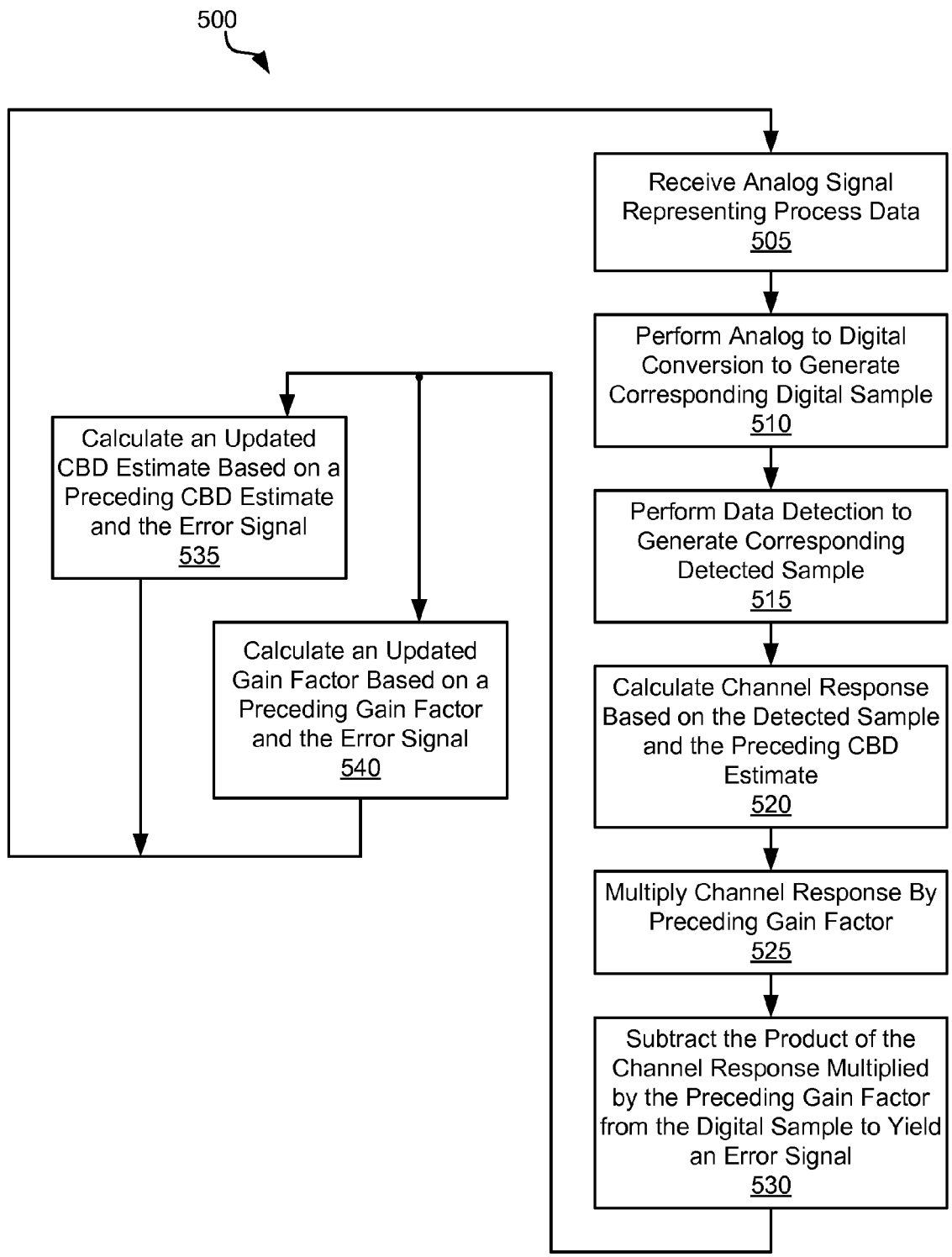
FIG. 6 is a flow diagram showing a method in accordance with various embodiments of the present invention for providing a continuous CBD estimate.

Turning to FIG. 6, a flow diagram 500 depicts a method in accordance with various embodiments of the present invention for providing a continuous CBD estimate. Following flow diagram 500, an analog signal representing some process data is received (block 505). In some cases, the analog signal may be provided via a read/write head assembly disposed in relation to a storage medium. As used herein, the phrase "process data" is used in its broadest sense to mean any data that may be used for performing a CBD estimate. Thus, process data may be data specifically designed to perform a CBD estimate, or more general data having uses beyond performing a CBD estimate. In some particular cases, the process data is user data as previously defined herein. An analog to digital conversion is performed on the analog signal to generate a digital sample (block 510). It should be noted that the digital sample may be subjected to a variety of processing including, but not limited to, band pass filtering, temperature compensation and/or phase adjustment before further processing proceeds. The digital sample is provided to a data detector where it is processed to generate a detected sample (block 515). Of note, the processes in flow diagram 500 are continuously repeated such that a series of digital samples and a series of detected samples are generated over time. A channel response is calculated based on the detected sample and the preceding CBD estimate (block 520). The channel response is multiplied by a previously calculated gain factor (block 525), and the product of the multiplication is subtracted from the digital sample to yield an error signal (block 530). An updated CBD estimate is calculated based on, among other things, the error signal and a preceding CBD estimate (block 535); and an updated gain factor is calculated based on, among other things, the error signal and a preceding gain factor (block 540).

The processes of flow diagram 500 may be repeated such that the updated CBD estimate and gain factor are adaptively calculated and continuously available for use by one or more processes. In other cases, the processes of flow diagram 500 may be repeated periodically such that the updated CBD estimate and gain factor are adaptively calculated during particular periods, and continuously available for use by one or more processes. In yet other cases, the processes of flow diagram 500 may be repeated whenever a trigger is detected such that the updated CBD estimate and gain factor are adaptively calculated for a period following reception of a trigger, and continuously available for use by one or more processes. Such a trigger may include, but is not limited to, an increased error rate or reduction in signal to noise ratio. Based on the disclosure provided herein, one of ordinary skill in the art will recognize a variety of triggers that may be utilized in accordance with different embodiments of the present invention.

Figure 7:
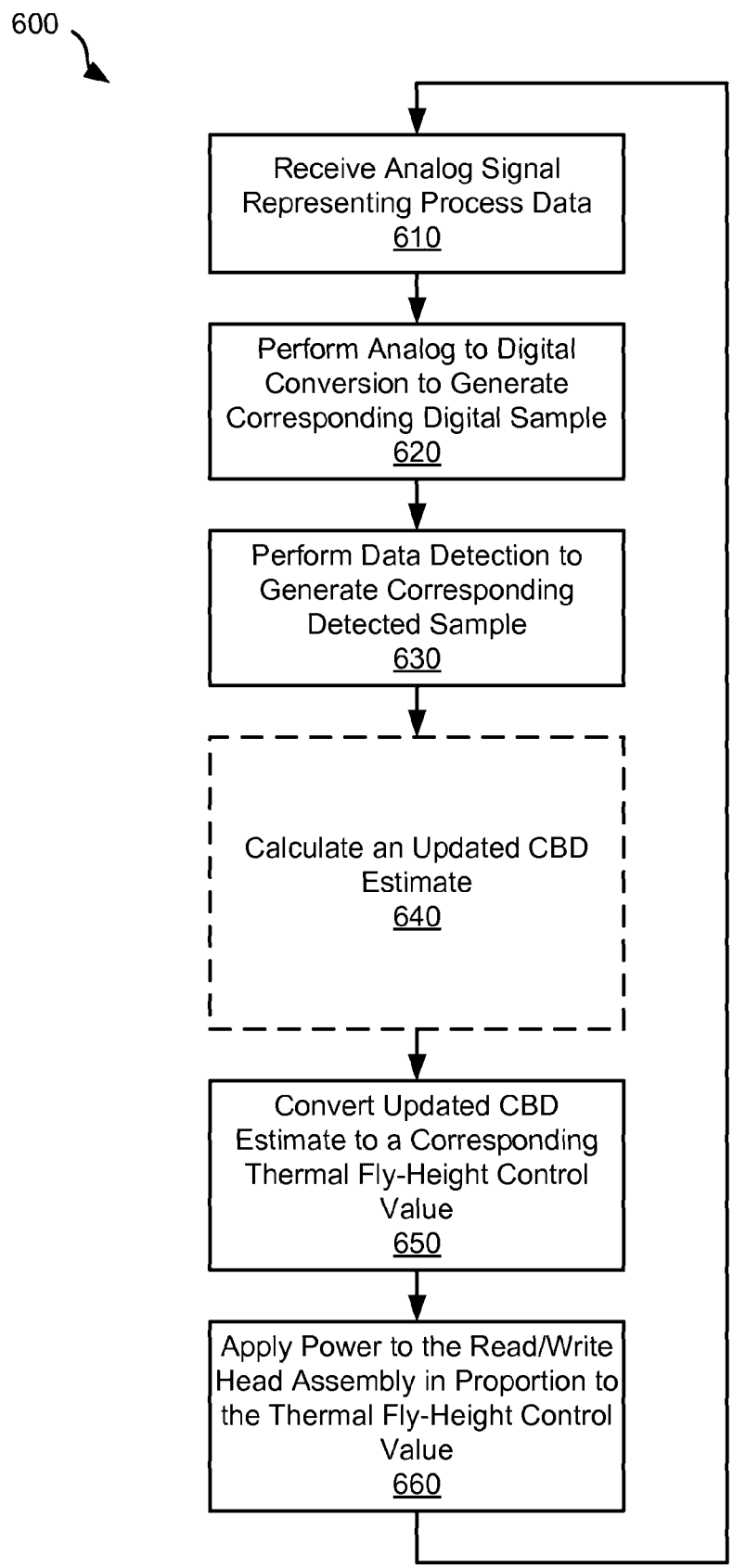
FIG. 7 is a flow diagram showing a method in accordance with one or more embodiments of the present invention for providing a continuous fly-height adjustment.

Turning to FIG. 7, a flow diagram 600 shows a method in accordance with one or more embodiments of the present invention for providing a continuous fly-height adjustment. Following flow diagram 600, an analog signal representing some process data is received (block 610). In some cases, the analog signal may be provided via a read/write head assembly disposed in relation to a storage medium, and it is passed through an analog front-end circuit in the read channel. As used herein, the phrase "process data" is used in its broadest sense to mean any data that may be used for performing a CBD estimate. Thus, process data may be data specifically designed to perform a CBD estimate, or more general data having uses beyond performing a CBD estimate. In some particular cases, the process data is user data as previously defined herein. An analog to digital conversion is performed on the analog signal to generate a digital sample (block 620). It should be noted that the digital sample may be subjected to a variety of processing including, but not limited to, band pass filtering, temperature compensation and/or phase adjustment before further processing proceeds. The digital sample is processed using a data detector to generate a detected sample (block 630). Of note, the processes in flow diagram 600 are continuously repeated such that a series of digital samples and a series of detected samples are generated over time.

Using the digital sample and the detected sample, an updated CBD estimate is calculated (block 640). This may be done in accordance with the processes discussed herein. The updated CBD estimate is then converted to a corresponding thermal fly-height control value (block 650), and power is applied to the read/write head assembly in an amount corresponding to the thermal fly-height control value (block 660). Such a power application results in a modification of the distance between the read/write head assembly and the storage medium due to thermal heating or cooling as is known in the art.

The processes of flow diagram 600 may be repeated such that fly-height is adjusted continuously during use of an associated storage medium. In other cases, the processes of flow diagram 600 may be repeated periodically such that the fly-height is adjusted only periodically. In yet other cases, the processes of flow diagram 600 may be repeated whenever a trigger is detected such that fly-height is only adjusted following reception of a trigger. Such a trigger may include, but is not limited to, an increased error rate or reduction in signal to noise ratio. Based on the disclosure provided herein, one of ordinary skill in the art will recognize a variety of triggers that may be utilized in accordance with different embodiments of the present invention.

In conclusion, the invention provides novel systems, devices, methods and arrangements for performing adaptive CBD estimation and/or fly-height adjustment. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A method for adaptively adjusting fly-height, the method comprising:
    providing a storage medium, wherein the storage medium includes information corresponding to a process data set;
    providing a read/write head assembly, wherein the read/write head assembly is disposed a variable distance from the storage medium;
    accessing the process data set from the storage medium;
    adaptively calculating a first channel bit density estimate based at least in part on a second channel bit density estimate calculated prior to the first channel bit density estimate and the process data set;
    modifying the variable distance based at least in part on the first channel bit density estimate;
    adaptively calculating a third channel bit density estimate based at least in part on a fourth channel bit density estimate calculated prior to the third channel bit density estimate and the process data set; and
    modifying the variable distance based at least in part on the third channel bit density estimate.

2. The method of claim 1, wherein modifying the variable distance based at least in part on the first channel bit density estimate includes:
    modifying a temperature of the read/write head assembly.

3. The method of claim 2, wherein modifying the temperature of the read/write head assembly includes:
    converting the first channel bit density estimate to a corresponding power value; and
    delivering a power output to the read/write head assembly corresponding to the power value.

4. The method of claim 1, wherein accessing the process data set from the storage medium includes performing an analog to digital conversion on the information corresponding to the process data set to create a series of digital samples, and performing a data detection on the series of digital samples to create a series of detected samples.

5. The method of claim 4, wherein the process data set includes both the series of digital samples and the series of detected samples.

6. The method of claim 1, wherein adaptively calculating a first channel bit density estimate includes:
    performing a channel model calculation using a channel model calculation circuit, and based at least in part on the series of detected samples and the second channel bit density; and
    subtracting an output derived from the channel model calculation circuit from the series of digital samples yield an error signal.

7. The method of claim 6, wherein the third channel bit density estimate is calculated based at least in part on the error signal, the series of digital samples, the series of detected samples, and the fourth channel bit density estimate.

8. The method of claim 1, wherein the process data set is user data, and wherein accessing the process data set from the storage medium is done in parallel to another operation involving the storage medium.

9. The method of claim 8, wherein the other operation involving the storage medium is a user application utilizing the process data set.

10. The method of claim 1, wherein the process data set is user data.

11. The method of claim 10, wherein the user data is non-periodic.

12. A continuous fly-height adjustable storage system, the system comprising:
   a storage medium, wherein the storage medium includes information corresponding to a process data set;
   a read/write head assembly disposed a variable distance from the storage medium;
   an adaptive CBD estimation circuit, wherein the adaptive CBD estimation circuit is operable to compute a series of channel bit density estimates based at least in part on preceding channel bit density estimates and the process data set; and
   a fly-height adjustment circuit, wherein the fly-height adjustment circuit is operable to modify the variable distance based on one or more of the series of channel bit density estimates.

13. The system of claim 12, wherein the fly-height adjustment circuit implements thermal fly-height control.

14. The system of claim 13, wherein the thermal fly-height control involves converting a subset of the channel bit density estimates into respective power values each calculated to modify the temperature of the read/write head assembly such that the variable distance is predictably changed.

15. The system of claim 12, wherein the fly-height adjustment circuit includes:
   a first conversion circuit, wherein the first conversion circuit converts a subset of the series of channel bit density estimates into respective fly-height conversion values; and
   a second conversion circuit, wherein the second conversion circuit converts the respective fly-height conversion values into respective power values each calculated to modify the temperature of the read/write head assembly such that the variable distance is predictably changed.

16. The system of claim 12, wherein the adaptive CBD estimation circuit includes:
   a read channel circuit, wherein the read channel circuit includes an analog to digital converter and a data detector, wherein the analog to digital converter receives an analog signal corresponding to the process data set and provides a series of digital samples corresponding to the analog signal, and wherein the data detector receives the series of digital samples and provides a series of detected samples based on the series of data samples.

17. The system of claim 16, wherein the process data set includes the series of digital samples and the series of detected samples.

18. The system of claim 17, wherein the adaptive CBD estimation circuit includes a channel model calculation circuit, wherein the channel model calculation circuit receives the series of detected samples and the first channel bit density estimate, and wherein the channel model calculation circuit provides a channel model output based at least in part on the series of detected samples and the first channel bit density estimate.

19. The system of claim 18, wherein the adaptive CBD estimation circuit includes a summation circuit, and wherein the summation circuit is operable to subtract an output derived from the channel model calculation circuit from the series of digital samples to yield an error signal.

20. The system of claim 12, wherein the process data set is user data.

21. A hard disk drive system, the system comprising:
   a storage platter, wherein the storage platter includes information corresponding to a process data set, and wherein the process data set is usable for both a user application and a fly-height adjustment calculation;
   a read/write head assembly, wherein the read/write head assembly is disposed a variable distance from the storage platter;
   a read channel circuit, wherein the read channel circuit includes an analog to digital converter and a data detector, wherein the analog to digital converter receives an analog signal corresponding to the process data set maintained on the storage medium and provides a series of digital samples corresponding to the analog signal, and wherein the data detector receives the series of digital samples and provides a series of detected samples based on the series of data samples;
   a channel model calculation circuit, wherein the channel model calculation circuit receives the series of detected samples and a first channel bit density estimate, and wherein the channel model calculation circuit provides a channel model output based at least in part on the series of detected samples and the first channel bit density estimate;
   a summation circuit, and wherein the summation circuit is operable to subtract an output derived from the channel model calculation circuit from the series of digital samples to yield an error signal;
   an adaptive CBD calculation circuit, wherein the adaptive CBD calculation circuit calculates a second channel bit density estimate based at least in part on an output derived from the channel model output, the error signal, the series of digital samples, and the series of detected samples; and
   a fly-height adjustment circuit, wherein the fly-height adjustment circuit is operable to modify the variable distance based on the second channel bit density estimate.

22. The circuit of claim 21, wherein the fly-height adjustment circuit implements thermal fly-height control.

* * * * *